US000001094H

United States Statutory Invention Registration [19]

[11] Reg. Number: H1094

Gorman

[43] Published: Aug. 4, 1992

[54] PROCESS TO PRODUCE TACK-FREE RUBBER PARTICLES

[75] Inventor: John E. Gorman, Houston, Tex.

[73] Assignee: Shell Oil Company, Houston, Tex.

[21] Appl. No.: 665,927

[22] Filed: Mar. 5, 1991

Related U.S. Application Data

[63] Continuation of Ser. No. 479,802, Feb. 13, 1990, abandoned.

[51] Int. Cl.[5] ..... C08F 6/00

[52] U.S. Cl. ..... 528/500; 525/314

[58] Field of Search ..... 523/326, 328, 330

[56] References Cited

U.S. PATENT DOCUMENTS

| | | | |
|---|---|---|---|
| 3,113,986 | 12/1963 | Breslow et al. | 260/683.9 |
| 3,251,905 | 5/1966 | Zelinski | 260/879 |
| 3,265,765 | 8/1966 | Holden et al. | 260/876 |
| 3,345,324 | 10/1967 | Bristol et al. | 260/41.5 |
| 3,390,207 | 6/1968 | Moss et al. | 260/879 |
| 3,598,887 | 8/1971 | Darcy et al. | 260/879 |
| 3,639,521 | 2/1972 | Hsieh | 260/880 |
| 3,804,145 | 4/1974 | Arnold et al. | 159/48 |
| 3,932,370 | 1/1976 | Landi et al. | 260/83.3 |
| 3,951,620 | 4/1976 | Frischmuth | 55/1 |
| 3,953,389 | 4/1976 | Holliday et al. | 523/330 |
| 4,073,755 | 2/1978 | Berg et al. | 521/17.4 |
| 4,183,887 | 1/1980 | Karg | 264/130 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,232,126 | 11/1980 | Marquisee | 521/65 |
| 4,250,082 | 2/1981 | Sommer et al. | 260/42.55 |
| 4,374,941 | 2/1983 | Sandstrom | 523/206 |
| 4,375,497 | 3/1983 | Sandstrom | 428/407 |
| 4,532,272 | 7/1985 | Wilt et al. | 523/330 |

FOREIGN PATENT DOCUMENTS

| | | |
|---|---|---|
| 1305380 | 1/1973 | United Kingdom . |
| WO83/03421 | 10/1983 | World Int. Prop. O. . |

*Primary Examiner*—Brooks H. Hunt
*Assistant Examiner*—Daniel Jenkins
*Attorney, Agent, or Firm*—Donald F. Haas

[57] ABSTRACT

A process to produce a free flowing fine polymer powder is provided. The process comprises the steps of: providing a polymer cement comprising a polymer either melt or dissolved in a solvent to form a polymer cement; dispersing an antiblocking agent within a stream consisting of steam to form atomization steam; atomizing the polymer cement; contacting the atomized polymer cement with the atomization steam; and recovering polymeric particles. Polymeric particles so prepared have an average particle size of between 100 and 1000 microns. In a preferred embodiment, the polymers produced are rubbery polymers which are free flowing.

17 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS TO PRODUCE TACK-FREE RUBBER PARTICLES

This is a continuation of application Ser. No. 479,802, filed Feb. 13, 1990, now abandoned.

BACKGROUND

This invention relates to a process for preparing a polymeric powder. In one aspect, this invention relates to the preparation of free flowing rubber particles having an average particle size within the range of about 100 microns and about 1000 microns.

Providing free flowing small particles of rubbery polymers provides challenges due to the inherently tacky nature of the polymers. Tire rubber, for example, are commonly commercially available in bales, but there are many advantages to supplying rubbery polymers in the form of free flowing particles. Free flowing rubber polymer particles are easier to handle and may be further processed without the need to grind the bales of rubber into workable size particles. Standard polymer blending, mixing and extruding equipment may be used to process free flowing particles of rubbery elastomers whereas additional equipment is required to process bales of rubber.

It is further desirable, in many applications, that the free flowing particles of rubbery polymers also be of a small particle size, i.e. a free flowing powder. Mixing of solid phase rubbery polymers into difficult to blend compositions is greatly enhanced by initially having rubbery polymers in the form of a free flowing powder. Blending of rubbery polymers into bitumens, for example, is very difficult, and a finely divided powder would disperse to smaller resin domains with less energy required for mixing. Blending of rubbery polymers into viscous polymer melts can also be greatly enhanced by the rubbery polymer particle initially being of small size. When blending rubbery particles into reactive compositions, a small rubbery polymer particle size can also be very important to prevent excessive gel formation due to the reactive material cross-linking the rubbery particles in regions where the rubbery material predominates.

Fine powders of polymers may be produced in a number of ways. One method involves injecting a high velocity jet of atomized molten polymer into a quenching fluid stream which rapidly cools and freezes the polymer into a fine powder. As the droplets of polymer freeze in this process, they are tacky, and will agglomerate when they impact each other. The size of the particles which can be produced by this process is therefore limited to larger sizes than are desired for some applications. Fouling can also occur in process equipment due to the tacky particles impacting the equipment. This process is particularly undesirable when applied to polymers which are not produced as a melt. The step of melting the polymers is expensive, requires additional capital equipment and can degrade a temperature sensitive polymer.

Methods for the preparation of rubbery polymers in the form of free flowing particles are known and have been described, for example, in U.S. Pat. Nos. 4,374,941 and 4,375,497. These methods involve mixing an aqueous carbon black dispersion with a rubber latex, coagulating the mixture with a single- or two-step coagulating process, followed by coating the coagulated suspension with a coating resin. The coating resin can be a surfactant-containing mixture of a styrene/butadiene resin and a styrene-α-methylstyrene or polystyrene resin coagulated at a temperature in the range of from 70°–90° C. Although the rubber particles thus prepared are claimed to be tack-free and pourable, the process by which these rubber particles are prepared is unattractive because the many steps involved. Further, many polymer applications cannot tolerate the required levels of surfactants.

It is also known to produce small rubbery polymer particles by steam atomizing a cement comprising the polymer dissolved in a solvent. The steam will evaporate a portion of the solvent and cause the polymer in the droplets to form solid particles. The solid particles will be tacky, particularly while some solvent is still present in the cement. The particles will therefore have a tendency to agglomerate into larger particles upon contact with one another. Particles of rubbery polymers made by the prior art steam atomization processes therefore tend to have average particle sizes of about 1000 microns or larger. Particle sizes smaller than this are desirable for many applications. These particles may be made to be free flowing by mixing antiblocking agents, such as silica, into the particles produced in this manner, but the size particles which can be achieved is limited by agglomeration before the particles are mixed with the antiblocking agent.

A typical method to prepare very small size particles of rubbery polymers is to grind the polymeric particles after cooling the particles cryogenically. Although this method can result in a sufficiently fine powder, it is very expensive. An alternative process to generate small particles of polymeric powders is to grind the rubber using known technology, and then separate the ground particles, recovering the size particles which are desired. This, again, is expensive and requires additional capital equipment.

It is therefore an object of this invention to provide a process for producing polymer particles, the polymer particles being a free flowing powder. An object in a preferred embodiment of this invention provides a process to produce free flowing elastomeric thermoplastic particles having an average particle size between about 100 microns and about 1000 microns. In another preferred embodiment, it is an object of this invention to provide a process to produce polymeric particles in which the process equipment fouls at a reduced rate.

SUMMARY OF THE INVENTION

The objects of this invention are accomplished by a process comprising the steps of: providing a polymer cement comprising a polymer dispersed in a solvent; atomizing the cement to form cement droplets; contacting the cement droplets with steam wherein an effective amount of antiblocking agent is dispersed in the steam and a substantial portion of the solvent is vaporized from the cement; and recovering a powder of free flowing polymer particles.

DETAILED DESCRIPTION OF THE INVENTION

The polymers which can be treated by the invention process to produce free flowing particles of small sizes include polymers which can be dissolved in a solvent and are solids at room temperature. This excludes polymers such as vulcanized rubbers, thermoset polymers, cured epoxies, liquid polymers and liquid pre-polymers. Examples of materials which are included are polyvinyl chlorides, nylons, fluorocarbons, polyethylene, polybutene, polyurethane prepolymer, polystyrene, polypropylene, polyphenylene ether, unvulcanized polybutadiene, unvulcanized polyisoprene, cellulosic resin, acrylic resin, solid epoxy prepolymer, and copolymers thereof. Each of these polymers are well known in the art and commercially available from numerous suppliers. Preferred polymers are elastomeric thermoplastics, and most preferred polymers are hydrogenated or unhydrogenated elastomeric copolymers of styrene and conjugated diolefins. The preference for rubbery polymers in the practice of this invention is due to the increased difficulty of preparing free flowing small particles of these polymers.

A preferred embodiment of this invention includes utilizing a polymer cement which comprises the effluent of a solution polymerization reactor. Polymers in a powder form are often prepared commercially from the polymerization reaction effluent by atomizing the polymer cement into a stream of steam, the steam then vaporizing a substantial portion of the solvent leaving a polymer powder. The practice of the present invention in this process involves dispersing the antiblocking agent into the steam before it is contacted with the polymer cement. Only a minor modification to existing equipment would therefore be required to practice this invention in many incidences. The portion of the solvent which is vaporized upon contact with the steam is preferably greater than 75% by weight of the initial solvent and more preferably greater than 90% by weight. Quickly vaporizing the solvent gives the antiblocking agent an opportunity to coat the polymer crumbs before they can agglomerate and form larger particles.

A particularly preferred embodiment of this invention includes utilizing a rubbery polymer such as hydrogenated or unhydrogenated block copolymers containing at least one vinyl arene block and at least one conjugated diolefin block because these polymers are typically prepared in an inert solvent, and recovered from the solvent by vaporizing the solvent using steam. Styrene and butadiene triblock and diblock copolymers and styrene and isoprene triblock and diblock copolymers are examples of these particularly preferred polymers. These block copolymers may be produced by any block polymerization or copolymerization procedures including the well known sequential addition of monomer technique, incremental addition of monomer technique or coupling technique as illustrated in U.S. Pat. Nos. 3,251,905; 3,390,207; 3,598,887 and 4,219,627, which are incorporated herein by reference. Tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, which are incorporated herein by reference.

These block copolymers are preferably hydrogenated to increase their thermal stability, tensile strength, high temperature properties and resistance to oxidation. The hydrogenation of these copolymers may be carried out by a variety of well established processes. Suitable hydrogenation processes are disclosed in U.S. Pat. Nos. 3,113,986 and 4,226,952, which are incorporated herein by reference. The copolymers are hydrogenated in such a manner as to produce hydrogenated copolymers having a residual ethylenic unsaturation content in the polyolefin block of not more than about 20 percent, preferably not more than about 10 percent, most preferably not more than about 5 percent, of their original ethylenic unsaturation content prior to hydrogenation.

Although the preferred practice of the present invention to produce a polymeric powder of average practical diameters between about 100 and about 1000 microns directly from solution polymerization reaction effluents, it is not a requirement of the invention that a polymerization reaction effluent constitute the polymer cement. A polymer may be dissolved in a solvent to obtain a cement in order to produce a finely divided powder by the practice of this invention.

A large number of solvents can be employed to prepare the polymer cement. Either polar or non-polar solvents may be required, depending on the polymer employed, and the solvent may comprise monomer units of the polymer. Preferred solvents are sufficiently violatile that a substantial portion of the solvent will vaporize when the cement is atomized with the atomization steam. Vaporization of the solvent at this point is necessary for a resultant droplet to contain a substantial portion of precipitated polymer. Solvents such as n-pentane, isopentane, hexane, cyclohexane, heptane, tetrafloral ether, benzene or xylene are particularly preferable, but other ethers, naphthenic hydrocarbon, aromatic hydrocarbons or paraffinic hydrocarbons are acceptable, along with mixtures of preferred solvents.

Atomization of the polymer cement may be performed by any of the methods known in the art. Atomization of liquids into small droplets is disclosed, for example, in Perry et al., *Perry's Chemical Engineers's Handbook*, 5th ed., pp. 18–58 to 18–64, which is incorporated herein by reference.

Antiblocking agents usually are small, unfunctionalized and generally inert particles. Examples of acceptable antiblocking agents include, but are not limited to, talc, aluminum oxide, silicon dioxide, calcinated aluminum, magnesium carbonate, calcium carbonate, silica, clay, alumina, titanium dioxide, high density polyethylene and zinc stearate. The antiblocking agent of this invention preferably has a particle size of between about 0.2 and about 10 microns and an average particle size between about 1 and about 8 microns. HiSil®, a silica antiblocking agent available from PPG Industries Inc. of Pittsburgh, Pa., is most preferred. HiSil is unique in that it forms a non-setting gel in cyclohexane. This is a desirable characteristic because an antiblocking agent which settles from a solvent will tend to plug process equipment of flow through the equipment is interrupted. Particularly preferred antiblocking agents are therefore those which have this non-settling characteristic.

The amount of antiblocking agent required for the practice of this invention depends upon the particle size of the polymer particles produced, the particle size of the antiblocking agent, and the efficiency of contact between the polymer melt or polymer cement and the steam or quench medium. Typically between about 80% and about 300% of theoretical coverage of the surface area of the polymer particles with antiblocking agent is sufficient to provide a free flowing particle. Preferably, this coverage is between about 90% and about 150%, and most preferably, this coverage is between about 90% and about 100% of theoretical coverage. Lesser amounts of antiblocking agent tend to not provide a free-flowing polymer. Larger amounts marginally improve the free flowing nature of the polymer, but at a diminishing level of effectiveness. It is also undesirable to dilute the polymer with larger amounts of anti blocking agents which may be undesirable in some end uses. Further, excessive amounts of antiblocking agent causes the polymer to be dusty to handle.

Theoretical coverage is estimated by calculating the volume of a shell around spheres of the diameter of the average particle size of the polymer particles produced, the thickness of the shell being the average particle size of the antiblocking agent. A theoretical coverage of 100% would be this volume of antiblocking agent. Typically, this theoretical coverage corresponds to about 1 to about 6 parts by weight based on 100 parts by weight of the polymer. Preferably, the amount of antiblocking agent is between about 1 parts and about 2 parts by weight based on 100 parts by weight of the polymer. Sufficient antiblocking agent is preferably added to result in small particle size and to prevent fouling of the polymer separation equipment. If additional antiblocking agent is required to keep the powder in a free flowing form during further handling and storage, antiblocking agent may be added to the powder by known physical mixing techniques in a subsequent optional mixing step.

The amount of steam utilized in the preferred embodiment of this invention is between about 10 and about 100 parts by weight per 100 parts by weight of polymer. The steam is preferably suffficiently superheated at the pressure of contacting with the atomized polymer cement to prevent condensation of water on the polymer particles. Other gases, such as nitrogen, carbon dioxide, methane, ethane and the like may also be utilized, but are generally not economical.

The steam antiblocking agent mixture is preferably prepared by pumping a slurry of the antiblocking agent in a liquid into the steam through a nozzle which distributes the slurry as a mist into the steam. Alternatively, the antiblocking agent may be aspirated into the steam as a powder or slurry. Other methods known in the art to inject finely divided solids into a vapor may also be used. If a slurry is prepared and then pumped into the steam lubricating oil may be added to the slurry to reduce erosion of the pump parts which contact the slurry. If a slurry is prepared, it is preferably from about 15 parts by weight of about 25 parts by weight antiblocking agent based on 100 parts by weight of slurry. The slurry is most preferably 18 parts by weight to about 20 parts by weight antiblocking agent based on 100 parts by weight of slurry.

The liquid used to produce the antiblocking agent slurry in preferably sufficiently volatile to substantially vaporize when the antiblocking agent slurry is contacted with the steam. It is most preferable to use as a liquid for the antiblocking agent slurry any of the solvents described above.

In the preferred embodiment of this invention, atomization steam and the polymer cement may be contacted at the discharge of an atomization nozzle where a mist of fine droplets of polymer cement is created. The atomization steam preferably causes at least a portion of the solvent to evaporate. The antiblocking agent which is dispersed in the atomization steam will at least partially coat the droplets of polymer cement, reducing the tendency of the droplets to agglomerate into large droplets. Droplets of polymer cement initially formed preferably have an average particle diameter between about 10 microns and about 30 microns.

The antiblocking agent which is dispersed in the steam also tends to coat the internals of the process equipment, reducing the fouling of the process equipment by tacky polymer droplets. This is an additional significant advantage of the present invention. Separation of polymer particles from the atomization steam of the prior art method is often performed using a cyclone separator. In the prior art steam atomization methods to produce powders from polymer cements, steam-cement contacting temperatures are limited because of cyclone fouling. Higher contact temperatures would more rapidly vaporize the solvent which results in smaller particle size, but at the expense of an increased rate of fouling of the cyclone. With the present invention, cyclone in this service will foul at significantly reduced rate at similar contact temperatures, or alternatively, foul at a similar rate at increased temperatures resulting in even smaller polymer particle sizes. The advantages of the present invention could therefore be used to increase run lengths between shutdowns along with, or instead of, reducing the polymer particle size. The present invention also reduces the static electricity which is generated by the flow of the steam and polymer particles in these systems.

EXAMPLE

A solution was prepared of 20% by weight of a block copolymer of styrene and butadiene in cyclohexane. The block copolymer had a molecular weight of about 83,000 and was about 13% by weight styrene and had a triblock structure of a hydrogenated polybutadiene midblock and two polystyrene endblocks, the polystyrene endblocks being of about equal molecular weight.

A slurry of antiblocking agent is cyclohexane was prepared. The antiblocking agent was HiSil® 233, an amorphous silicon dioxide with 0.5 to about 2 microns particle size sold by PPG Industries Inc. of Pittsburgh, Pa. The slurry was about 20% by weight HiSil® 233. The slurry was pumped through a nozzle into a ¾" steam pipe, the nozzle being a 1/16 inch diameter hole drilled in a stainless steel plate welded on the end of a ⅛" diameter tubing. The tubing was perpendicular to the flow of steam in the pipe, and the nozzle was orientated at about the center line of the pipe. The steam was initially saturated steam at 150 psig pressure. The pressure of the steam was reduced from 150 psig by a control valve upstream of the slurry injection.

The polymer cement has heated to between 270° and 400° F. and pumped into the steam line about 6" downstream of the slurry injection through a nozzle identical to that used for injection of the slurry.

The polymer particles were separated from the steam and resultant cyclohexane vapors in two cyclone separators. The ¾" steam line was unrestricted from the slurry injection to the inlet of the cyclone separator. The cyclone separator inlets were tangent to the cyclone and perpendicular to the center line of the cyclone cylinder. Each cyclone had about a 4" internal diameter. Steam educators were used to remove vapors from the top of each cyclone, maintaining the pressures of the cyclones at about 15 and 18 psi vacuum for the first and second cyclone respectively. Steam was used to pneumatically convey the polymer particles from the solids outlet of the first cyclone to the second cyclone inlet. This steam provided a second state of solvent removal from the polymer particles.

About 5 pounds of free flowing block copolymer powder were produced in about 30 minutes using about 0.2 pounds, per pound of polymer, of steam to the first cyclone, and about 0.025 pounds of HiSil® per pound of polymer.

A free flowing powder of polymer containing less than 10% by weight of cyclohexane was produced. The average particle size of the polymer powder was about 400 microns as measured by sieve analysis.

The cyclones were free of fouling polymer particles at the end of the 30 minute run. Comparative runs without injection of an antiblocking agent at similar contact temperatures resulted in fouling to the point of inoperability within 10 to 15 minutes of operation.

I claim:

1. A process to produce a powder of free flowing polymer particles, the process comprising the steps of:

(a) dispersing an amount of antiblocking agent, effective to prevent fouling of down stream equipment and to result in free flowing polymer particles, in a stream of steam to form a atomizing steam stream which does not contain polymer cement;

(b) atomizing a polymer cement, comprising polymer dispersed in a solvent and which is discharged from an atomization nozzle creating a mist of fine droplets of polymer cement, by contacting the polymer cement at the discharge of the atomization nozzle for the polymer cement with the stream of atomizing steam, wherein a substantial portion of the solvent is vaporized from the atomized polymer cement; and (c) recovering a powder of free flowing polymer particles from the steam-atomized polymer cement wherein said polymer particles have an average particle diameter between about 100 and about 1,000 microns withouot grinding the polymer particles.

2. The process of claim 1 wherein the antiblocking agent is a finely divided power.

3. The process of claim 1 wherein the antiblocking agent is selected from the group consisting of aluminum oxide, silicon dioxide, calcinated aluminum, zinc stearate, calcium carbonate, clay, talc, titanium dioxide, high density polyethylene, magnesium carbonate, and combinations thereof.

4. The process of claim 1 wherein the step of recovering powder of free flowing polymer particles is accomplished by a process comprising passing the steam-atomized cement mixture through a cyclone separator.

5. The process of claim 1 wherein the cement is a solution in which the polymer was synthesized by a living polymerization process.

6. The process of claim 1 wherein the antiblocking agent is dispersed in steam by forcing a slurry containing the antiblocking agent through an atomization nozzle in the presence of the steam.

7. The process of claim 1 wherein the polymer is a block copolymer comprising at least one block comprising polymerized vinyl arene monomer units and at least one block comprising polymerized conjugated diene monomer units.

8. The process of claim 7 wherein the block copolymer is hydrogenated.

9. The process of claim 8 wherein the hydrogenated block copolymer is a hydrogenated styrene-butadiene-styrene block copolymer.

10. The process of claim 7 wherein the hydrogenated block copolymer is a hydrogenated styrene-butadiene block copolymer.

11. The process of claim 6 wherein the slurry comprises between about 1 and about 6 parts by weight of an antiblocking based on 100 parts by weight of slurry in a volatile liquid.

12. The process of claim 11 wherein the antiblocking agent is a silica.

13. The process of claim 11 wherein the volatile liquid is predominantly cyclohexane.

14. The process of claim 1 wherein the solvent is selected from the group consisting of hexane, cyclohexane, heptane, benzene, xylene, and mixtures thereof.

15. The process of claim 1 wherein the polymer is an elastomeric thermoplastic.

16. The process of claim 1 wherein the effective amount of antiblocking agent is between about 80 percent and about 300 percent of theoretical coverage for the free flowing polymer particles.

17. In a process for removing solvent from a polymer cement in a cyclone separator wherein the polymer cement is discharged from an atomization nozzle in the cyclone separator and a mist of fine droplets of polymer cement is created, the improvement which comprises producing a powder of free flowing polymer particles having an average particle diameter between about 100 and about 1,000 microns without grinding by dispersing an amount of an antiblocking agent, effective to prevent fouling of downstream equipment and to result in free flowing polymer particles, in a steam of steam to form an atomizing steam stream which does not contain polymer cement and then contacting the polymer cement at the point of discharge from the polymer cement atomization nozzle with the stream of atomizing steam.

* * * * *